No. 648,679. Patented May 1, 1900.
T. ARMITT.
BRAIDING MACHINE.
(Application filed Jan. 18, 1900.)
(No Model.)
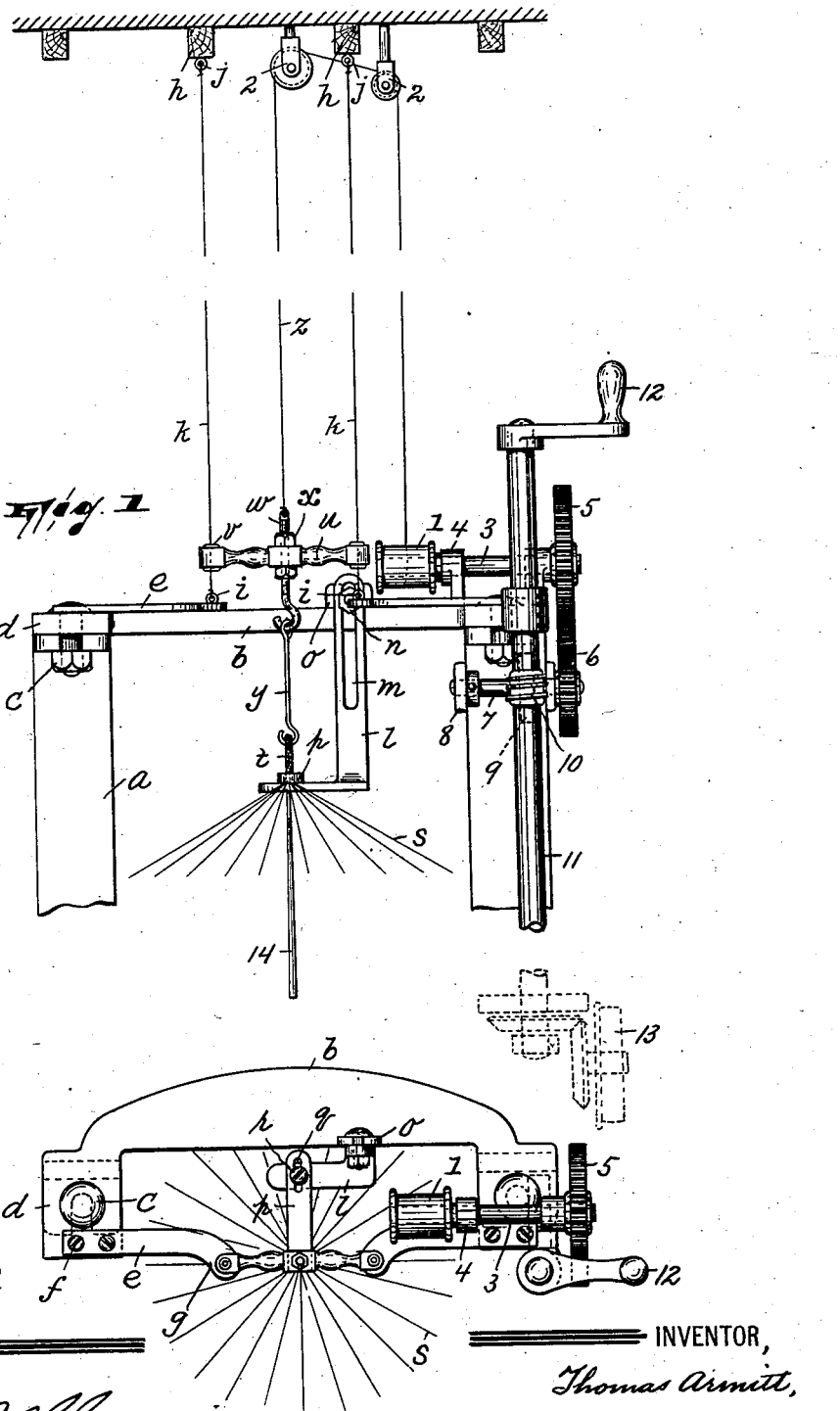

UNITED STATES PATENT OFFICE.

THOMAS ARMITT, OF CLIFTON, NEW JERSEY.

BRAIDING-MACHINE.

SPECIFICATION forming part of Letters Patent No. 648,679, dated May 1, 1900.

Application filed January 18, 1900. Serial No. 1,831. (No model.)

*To all whom it may concern:*

Be it known that I, THOMAS ARMITT, a citizen of the United States, residing in Clifton, in the county of Passaic and State of New Jersey, have invented certain new and useful Improvements in Braiding-Machines; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

This invention relates to braiding-machines; and it consists in an auxiliary mechanism for machines of this nature of great utility in manufacturing the material described in my copending application, filed October 19, 1899, Serial No. 734,047. This material, briefly described, consists of a flexible core about which the braid is formed, the braid and the core coacting to secure in place stems of leaves, shafts of feathers, &c., which extend through the braid and between the same and the core, thus producing artificial branches, feathers, sprays of flowers, &c. It is of course impracticable to wind a material of a nature such as this upon reels or spools, and so I have provided the mechanism above referred to and hereinafter particularly described for holding it in place until a predetermined quantity of it has accumulated.

Referring to the accompanying drawings, wherein I have fully illustrated my invention, Figure 1 is a view in elevation of the upper portion of a braiding-machine and showing my auxiliary mechanism therefor, and Fig. 2 is a top plan view of what is shown in Fig. 1.

*a* designates a pair of standards which project upwardly from the frame of the braiding-machine and constitute a portion thereof and which are surmounted by a bridge-plate *b*, said bridge-plate being secured to the standards by bolts *c*. While connecting the two standards *a*, the bridge-plate does not span the space directly between them, but is formed with a recess produced by providing the ends of the plate with parallel projections *d*, which the bolts *c*, for securing said plate in position, penetrate.

*e* designates a pair of arms secured to the projections *d*, preferably by means of screws *f*, and arranged in opposition and projecting toward each other. The free ends of these arms *e* are turned slightly outwardly, as at *g*, though this is not essential.

*h* designates a supporting means arranged vertically above the braiding-machine. This supporting means may be a pair of the beams sustaining the apartment in which the machine is situated or any other stationary elements. To the arms *e* I secure eyes *i*, and preferably perpendicularly above these eyes I secure to the supporting means *h* other eyes *j*. Each eye *i* and its corresponding eye *j* are connected by a taut wire or other similar device *k*.

*l* is an L-shaped bracket having a vertical slot *m*, whereby it is adjustably secured, by means of a bolt *n*, to a lug *o* on the plate *b*, said bracket projecting downwardly from the plate and carrying at the extremity of its horizontal portion a horizontally-extending arm *p*, and said arm being provided with a longitudinal slot *q*, which is penetrated by a set-screw *r*, adapted for adjustably securing each arm to the bracket.

The end of the arm *o* is provided with an opening through which the fibers or threads *s*, that are to produce the finished braided material *t*, extend and within or near which the braiding or interweaving of the threads is effected. The arm *p* is adapted to be adjusted, so as to bring its opening in the vertical plane of the two wires *k* and midway between them.

Arranged on the wires *k*, so as to be guided thereby, is a carrier to which the extremity of the finished material is adapted to be connected, as hereinafter described, and which is adapted to be elevated, drawing said material after it and maintaining it at the proper tension. Said carrier consists of a bar *u*, which is penetrated at its ends by tubes *v*, through which the wires *k* extend. Said carrier also comprises as a part of its structure a threaded hook *w*, which extends through the bar at the central portion thereof, being secured in place by nuts *x*, binding against the opposite faces of the bar. Suspended from the hook *w* is another and similar hook *y*, to which the end of the finished material is directly connected. *z* designates a cord or other flexible connection which is fixed to the upper end of the hook $w$ at one of its ends and which at the other of its ends passes over a spool or drum 1, upon which it is adapted to be wound. Intermediate the hook and the drum the cord extends over pulleys 2, stationarily mounted in proximity to the supporting means $h$.

The drum 1 is mounted upon one end of a shaft 3, which is journaled in bearings 4, mounted upon the plate $b$, while on the other end of the shaft 3 is secured a pinion 5, that is in mesh with another pinion 6, carried by a revoluble shaft 7. The shaft 7 is journaled in brackets 8, projecting from one of the standards $a$, and it carries a worm-wheel 9, (shown in dotted lines in the drawings,) whose teeth engage a worm 10 upon a vertical shaft 11. The shaft 11 may be operated manually by a crank and handle 12 or automatically by gearing 13. (Shown in dotted lines in Fig. 1.)

In operation as fast as the material is produced the drum 1 is rotated either automatically from the gearing 13 or manually by the crank and handle 12, as above set forth, thus elevating the carrier and keeping the finished material at the proper tension. As fast as the material is braided, the stems of the leaves, the shafts of the feathers, &c., are introduced among the intertwining threads in the neighborhood of the arm $p$, their free ends projecting downwardly. Simultaneously the core (designated by the reference character 14 in Fig. 1) is introduced up into the convergence of the cone of threads $s$. As fast as the finished material is elevated, therefore being suspended vertically and not having to pass over pulleys or the like, it keeps its shape. Of course the supporting means may be disposed at any desired distance above the machine, as hereinbefore intimated.

Having thus particularly described my invention, what I claim as new, and desire to secure by Letters Patent, is—

1. In a braiding-machine, the combination, with the frame thereof and with a support disposed appreciably remote therefrom and above the same, of guiding means connecting said frame and the support, said guiding means being rectilineal in form, a carrier engaging and movable on said guiding means, and means for elevating said carrier, the finished material being adapted to be connected to said carrier to be elevated therewith, substantially as described.

2. In a braiding-machine, the combination, with the frame thereof and with a support disposed appreciably remote therefrom and above the same, of arms projecting from said frame, a plurality of parallel wires connecting said arms and the support, a carrier penetrated by said wires and movable thereon, and means for elevating said carrier, the finished material being adapted to be connected to said carrier to be elevated therewith, substantially as described.

3. In a braiding-machine, the combination, with the frame thereof and with a support disposed appreciably remote therefrom and above the same, of arms projecting from said frame, a plurality of parallel wires connecting said arms and the support, a carrier penetrated by said wires and movable thereon, pulleys disposed contiguous to said support, a revoluble drum, means for rotating said drum, a flexible connection extending over said drum at one of its ends and secured to the carrier at the other of its ends, said flexible connection passing over the pulleys, and the finished material being adapted to be connected to said carrier to be elevated therewith, substantially as described.

4. In a braiding-machine, the combination, with the frame thereof and with a support disposed appreciably remote therefrom and above the same, of arms projecting from said frame, a plurality of parallel wires connecting said arms and the support, a bar penetrated by said wires near its ends and movable thereon, a hook carried by said bar, pulleys disposed contiguous to said support, a revoluble drum, means for rotating said drum, and a flexible connection extending over said drum at one of its ends and secured to the hook at the other of its ends, said flexible connection passing over the pulleys, and the finished material being adapted to be connected to said hook to be elevated therewith, substantially as described.

In testimony that I claim the foregoing I have hereunto set my hand this 16th day of January, 1900.

THOMAS ARMITT.

Witnesses:
JOHN W. STEWARD,
JAMES B. NEWTON.